Jan. 14, 1930.  C. T. CABRERA  1,743,524
SEPARATION PROCESS AND APPARATUS
Filed Nov. 15, 1927
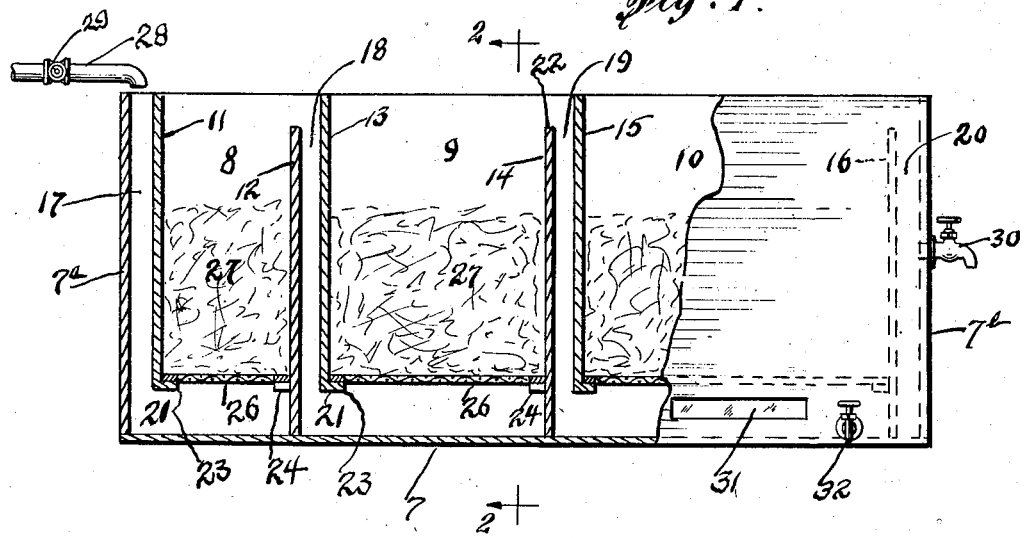
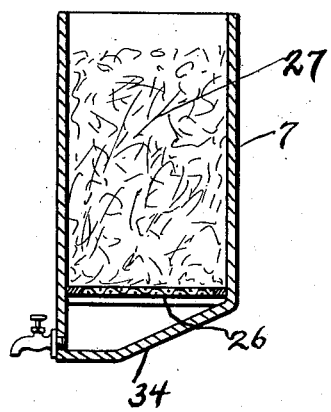
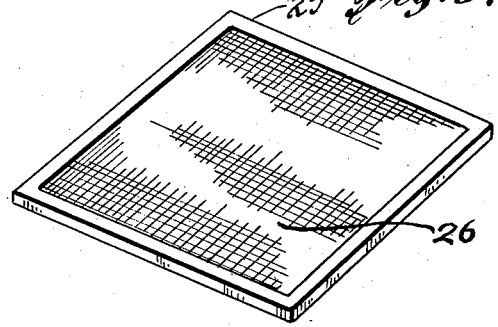
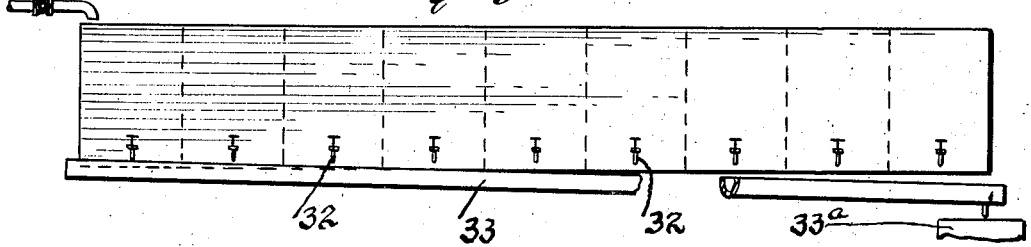
INVENTOR
Charles T. Cabrera
BY
P. Frank Hanick
ATTORNEY Patented Jan. 14, 1930

1,743,524

UNITED STATES PATENT OFFICE

CHARLES T. CABRERA, OF PHILADELPHIA, PENNSYLVANIA, ASSIGNOR TO ELECTRO-DIALYZER CORPORATION, A CORPORATION OF NEW YORK

SEPARATION PROCESS AND APPARATUS

Application filed November 15, 1927. Serial No. 233,497.

This invention relates generally to filtration processes and is more particularly directed to the separation of solids from fluids, especially the so-called suspended solids, which, by reason of their physical or chemical characteristics, cannot be successfully removed from the fluid vehicle by the existing methods of separation.

As is well known, solid-laden fluids are subjected to various forms of treatment for accomplishing the segregation or removal of the constituent solids, as by screening through fine mesh reticulated metallic or other fabric, or through sand and other earth materials or by any of the common settling or precipitation processes. However, due to the characteristics of certain of the solids within the carrier none of the existing methods has provided a commercially practical and economical means for effecting the complete, or a substantially complete, clarification or purification of the fluid. For example, the fine glutinous matter, the minute particles of organic and animal matter and other matter in a colloidal or similar state which remain in suspension within a liquid, are not susceptible to ready separation, as are crystaloids and like solids.

Attempts have been made to extend the utility of present apparatus to the separation of solids in suspension, by employing fine mesh screens and by filtering the liquid through densely packed sand, but they have been unsuccessful for one reason or another. For instance, where it has been found feasible to produce a fairly efficient screening action, the rapidity of the accumulation of slimes and other sediment, and the clogging of the filtering element, with the resulting stoppage of the process, have negatived any advantages that may have accrued.

From the foregoing, it will be manifest that no practical method of separating suspended solids from their fluid vehicle now exists, and the primary object of the present invention is to provide a simple and efficient method and means of accomplishing such separation, which will be applicable to a multiplicity of uses, as for example, in the treatment of industrial and other fluid waste, refining processes, water purification systems and in the clarification of liquids and fluids generally, for various purposes.

While my invention is particularly advantageous in the separation of suspended solids from their liquid carrier, it is also my object to improve the efficiency and extend the scope of utility of filtration processes and apparatus generally, by providing means for multiplying the effective screening or filtering area of an apparatus of standard type and without increasing the size or over-all dimensions thereof. Obviously, this will permit of the practicing of my method of separation for those purposes to which it may be applicable, by the use of available apparatus, as well as through the medium of apparatus specially designed for the embodiment of the various elements of my invention.

Other objects and advantages flowing from the practicing of my invention, will doubtless present themselves as the description proceeds, and I would have it clearly understood that I reserve unto myself all rights to the full range of equivalents of the steps of my method, irrespective of their sequence, and to the means whereby such steps may be carried into effect, as well as to all uses to which my invention may be applicable, within the spirit and scope of this disclosure.

Briefly stated, in the practicing of my method for effecting the separation of solids, and especially suspended solids, from their fluid carriers or vehicles, I filter or pass the liquid through a bed or mass of fragmentized material, such mass being preferably composed of two unlike or dissimilar metals, in the form of shavings or of a texture corresponding to that of commercial metallic wool. Of course, for some purposes, the mass or bed may be constituted of a single metal, or nonmetallic elements of different characteristics may be used in association with metal or otherwise.

While from the foregoing and the description which will follow, it will be apparent that my invention is generic in its application to the purification and clarification of liquids or fluids, in order that the same may be clearly understood, I have elected to describe certain preferred elements whereby the steps of my method of separation may be carried out in conjunction with the treatment of certain forms of industrial waste, as the solid-laden liquid offal of vegetable canning plants. Again, however, I would have it understood that this election does not constitute a limitation of the scope of my invention, either with respect to my method and the steps thereof, or the means whereby it may be practiced, or as to the uses to which it may be applied.

I shall now describe my invention as it may be carried into effect, in conjunction with a typical form of apparatus, as shown in the accompanying drawings, in which—

Figure 1 is a side elevation, partly in section, of said apparatus.

Figure 2 is a transverse section on the line 2—2 of Figure 1.

Figure 3 is a view in perspective of a removable screen, which may be used as a support for the bed or mass of fragmentized material, and, Figure 4 is a side elevation of an enlarged apparatus, illustrating a means whereby the precipitated matter or screenings may be carried off and collected.

Referring now to the drawings in detail, in which like characters of reference are employed to designate similar parts in the several views, 7 indicates a preferably rectangular tank or vat of wood or other suitable material, and of such dimensions and capacity as may be required for the work which is to be performed.

This tank or vat is subdivided into a plurality of compartments 8, 9 and 10, by suitable vertical walls or partitions 11, 12, 13, 14, 15 and 16, disposed transversely thereof, the partition 11 in cooperation with the end wall 7ᵃ of the tank or vat forming a relatively narrow passage 17, while similar passages 18, 19 and 20 are respectively defined by the adjacent partitions 12 and 13 and 14 and 15 and by the partition 16 and the other end wall 7ᵇ of the tank.

As will be observed, the partitions or walls 11, 13 and 15 extend downwardly from the upper edge or top of the tank or vat 7 to a point spaced above the base thereof, as generally indicated by the reference character 21, while the remaining walls 12, 14 and 16 are supported upon the base or bottom of said tank and terminate on a line below the top or rim thereof, as at 22.

Each of the partitions 11, 13 and 15 is provided with a cleat or inwardly directed flange 23 along its lower edge, which cooperates with a similarly disposed element 24 fixed to each of the opposite walls or partitions 12, 14 and 16 to support a rectangular frame 25 to which is secured a metallic or non-metallic screening material 26 of any suitable mesh, these screens functioning as the bases or bottoms of the respective compartments 8, 9 and 10 within which they are located.

Supported upon the screen or perforate base of each compartment 8, 9, and 10 is a mass of fragmentized metal 27 prepared in the form of shavings or strands and preferably compacted or pressed into relatively close association, for the purposes which will hereinafter become apparent. A suitable inlet 28, controlled by a valve 29, leading from a source of liquid supply (not shown) communicates with the passage 17, while a tap or spigot 30 is connected into the passage 20 at the opposite end of the tank or vat.

Now, as the liquid to be clarified is admitted to the receiving passage 17, it fills the communicating space beneath the head compartments 8 and, as the flow continues, rises through the retaining screen forming the base of said compartment and the resilient mass or bed of metallic shavings or wool supported thereby, the solids being trapped and retained in the various and irregular meshes or interstices of the mass. Continuing to rise within the head compartment, the partially clarified liquid overflows the partition 12 and passing downward through the passage 18 seeps or rises through the supporting screen and the separating mass of fragmentized metal in the second compartment 9. In the second stage, further clarification is effected by the removal of those solids which were not restrained from movement with the liquid during the first stage of the filtering process. Again, the liquid overflowing the dam or wall 14 rises through the separating elements in the final filtering stage, the liquid rising above the metallic mass within the compartment 10 and overflowing the partition 16 into the passage or outlet chamber 20 being cleared of all solids, including suspended matter. Obviously, the completely clarified liquid is withdrawn from the chamber or passage 20, through the aforesaid tap or spigot 30.

It will be noted that the second compartment 9 is larger than the head compartment 8, while the third compartment, in which the final filtering stage is effected, is greater in area than compartment 9. By this means I am enabled to slow up or retard the rate of rise of the liquid in the progressive stages of the process. Thus the gravity, or the specific weight, of the finest matter is sufficient to resist the reduced rate of rise of the current, so that it either remains at the bottom of the tank or adheres to the entangling meshes of the metallic filtering element. It will be apparent, of course, that the mechanical screening action of the metallic filtering element may be changed by loosening up or compressing the mass, as the case may be.

At the conclusion of the filtering process, or whenever an observation taken through the windows 31 shows that removal of the accumulation of sediment is necessary, the tap 32 communicating with each compartment is opened and the compartment and connecting passages drained into the inclined trough 33, whereby the sediment is conveyed to a suitable receiver or receptacle 33ª, for such disposition as may be found necessary or desirable. Cleansing of the filter elements is readily accomplished by loosening up the mass without removal from the compartment, and subjecting it to a flow of clean water, this water in running off carrying with it any sediment which had not been directed to the drain taps by the inclined surface 34 of the base of the tank. (See Fig. 2.)

It has been found in the actual practice of this invention that the mechanical screening action of the mass of metallic shavings or strands produces results in the clarification of liquids which have not been obtainable by any of the filtering or separation processes heretofore known.

Further, by utilizing two unlike or dissimilar metals in the composition of the filtering mass, unusually powerful galvanic couples are produced by the contacting metals, resulting in the setting up of local currents in the liquid passing through the mass. These electrolytic properties have been ascertained to be most effective in the separation of matter in a colloidal state from its fluid or liquid vehicle or carrier. For example, the treatment of such colloidal clays as benonite and kaoline, lead and zinc shavings in contact, and forming galvanic couples, as aforesaid, produced results which, heretofore, have been impossible of attainment in separation processes.

Manifestly, where ordinary fine separation of solids from their fluid vehicle is the objective, the mass of filtering material may be wholly composed of one metal, while where the separation or recovery of colloidals and other matter affected by the electrolytic action is desired, the filtering element may embody the necessary agencies for producing such electrolytic action. In some cases, it may be found desirable to combine a metal and a non-metallic element in the composition of the filtering mass or bed, or two non-metallic elements may be employed in the attainment of the objects to which my invention is directed.

While I have described the metallic filter element as fragmentized metal in the form of shavings or of the characteristics of metallic wool, it may, of course, take other forms, as filings or other multi-surfaced bodies. However, metal, in the preferred form described, will possess a degree of yieldability in response to the impinging liquid, as the latter rises therethrough, which will result in constant motion of the mass within itself, bringing about changes in the sizes and locations of the openings and tending to deflect and arrest the movement therewithin of particles of matter which would be carried through an inert perforate body, as a screen of the usual type. Another advantage residing in the employment of fragmentized metal, is the increased area of filtering surface which may be obtained in an apparatus of given dimensions. Obviously, a relatively compact mass of fragmentized metal placed in a compartment designed to take the usual screen of an area of twelve square feet, will have many times the effective surface of such a screen.

From the description of my invention, it will be plainly evident that I have evolved a simple, practical and economical method or process of separating or recovering solids from fluids, and that my invention and the means for carrying it into effect, as described, together with their equivalents, are susceptible to a multiplicity of uses, as hereinbefore pointed out.

What I claim is:

1. A method of separating solids from liquids which consists in flowing the solid-laden liquid through a plurality of filtering elements composed of fragmentized metal in a predetermined sequence and at different rates of flow.

2. An apparatus for separating solids suspended in a liquid, embodying a plurality of communicating tanks, each containing a filtering element composed of a mass of fragmentized metal, means for effecting the passage of the liquid through each of said tanks in sequence and means for progressively reducing the rate of flow of said liquid through the apparatus.

3. An apparatus for separating solids from a liquid vehicle, embodying a tank, a plurality of compartments arranged within said tank, said compartments being of graduated dimensions communicating passages between said compartments, perforate means forming the base of each compartment, a mass of fragmentized metal supported within each compartment by the base thereof and means for admitting a solid-laden liquid at one end of said tank for passage through said compartments in sequence, the solid bearing liquid raising through the fragmentized metal in each thereof, whereby separation of the solids and matter suspended within said liquid is effected.

CHARLES T. CABRERA.